Figure 1:
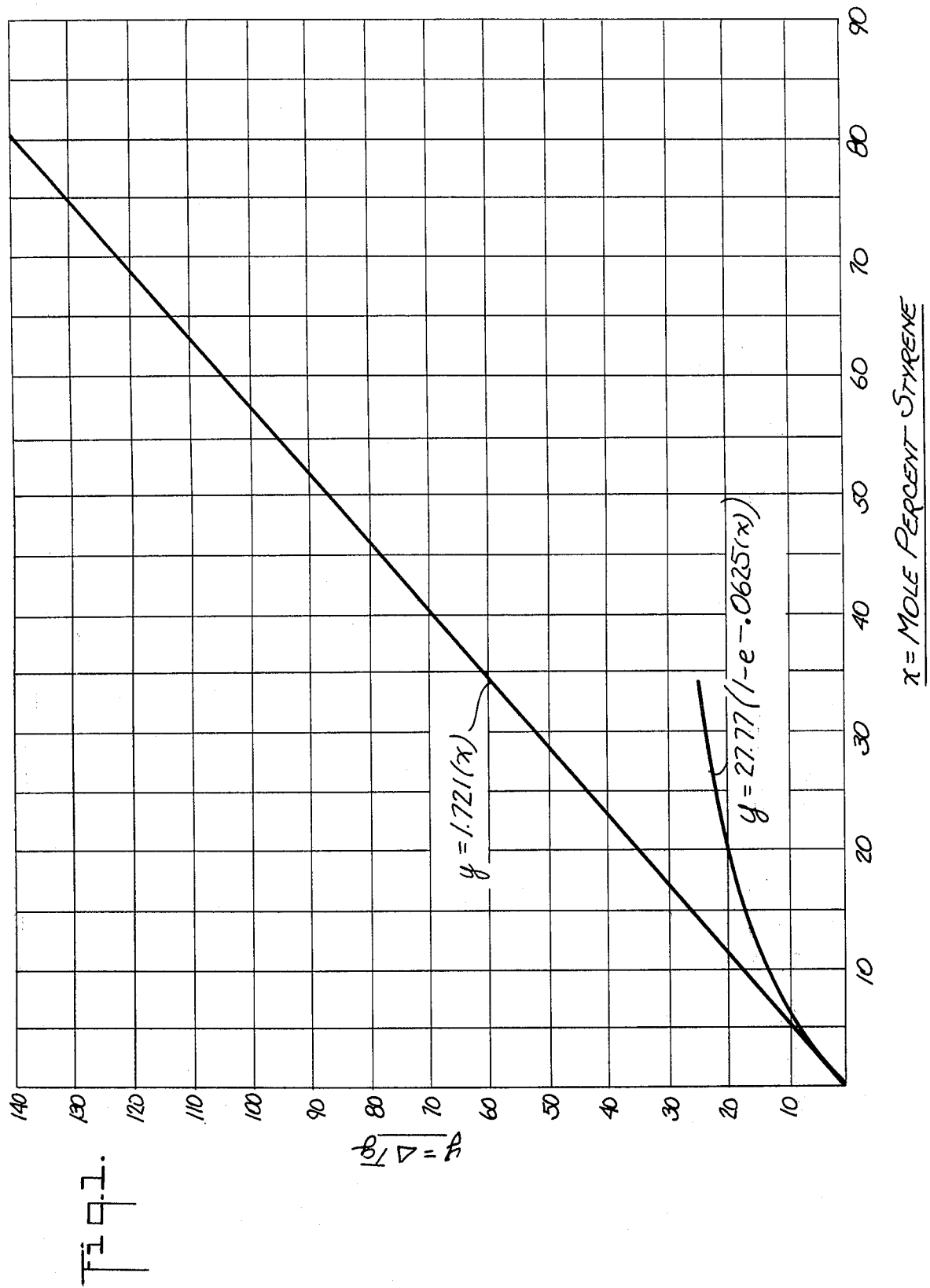

United States Patent [19]

Loveless

[11] 3,944,528

[45] Mar. 16, 1976

[54] SOLUTION DIENE ELASTOMERS BY ALKYL LITHIUM CATALYSIS

[75] Inventor: Frederick C. Loveless, Cheshire, Conn.

[73] Assignee: Uniroyal, Inc., New York, N.Y.

[22] Filed: Feb. 12, 1975

[21] Appl. No.: 549,416

Related U.S. Application Data

[60] Division of Ser. No. 421,458, Dec. 3, 1973, abandoned, which is a continuation-in-part of Ser. No. 289,042, Sept. 14, 1972, abandoned.

[52] U.S. Cl. ............. 260/83.7; 260/84.1; 260/84.7; 260/94.2 T; 260/880 B; 252/431 L
[51] Int. Cl.² .................. C08F 236/10; C08F 4/56
[58] Field of Search.... 260/83.7, 84.1, 84.7, 94.2 T; 450/682; 452/431 L

[56] References Cited
UNITED STATES PATENTS

| | | | |
|---|---|---|---|
| 3,324,191 | 6/1967 | Wofford | 260/94.2 T X |
| 3,496,154 | 2/1970 | Wofford | 260/84.7 |
| 3,872,177 | 3/1975 | Halasa | 260/83.7 X |

FOREIGN PATENTS OR APPLICATIONS

| | | | |
|---|---|---|---|
| 4,538,067 | 12/1970 | Japan | 450/682 |

*Primary Examiner*—William F. Hamrock
*Attorney, Agent, or Firm*—Willard R. Sprowls

[57] ABSTRACT

This invention relates to a solution process for preparing copolymers of a conjugated diene hydrocarbon and a vinyl-substituted aromatic hydrocarbon using a potassium-modified organolithium catalyst. The Li/K molar ratio is varied depending upon whether a random or pseudorandom copolymer is desired and depending on whether an aliphatic hydrocarbon or aromatic hydrocarbon solvent or a mixture of such solvents is used. The invention includes the pseudorandom copolymers formed by the process of the invention, such copolymers being characterized, in part, by having blocks with two to four units of the vinyl-substituted aromatic hydrocarbon interspersed throughout the copolymer chain.

11 Claims, 1 Drawing Figure

SOLUTION DIENE ELASTOMERS BY ALKYL LITHIUM CATALYSIS

This is a division of application Ser. No. 421,458, filed Dec. 3, 1973, now abandoned, which, in turn, is a continuation-in-part of Ser. No. 289,042, filed Sept. 14, 1972, now abandoned.

This invention relates to the preparation of conjugated diene copolymers by a solution process. The improvement consists in the use of a soluble cocatalyst which is made up of an organolithium compound and a complex of a potassium phenolate. The invention also relates to the pseudorandom copolymers which are obtained by this solution process.

Among the prior art in this field are the following patents. U.S. Pat. No. 2,975,160, to Zelinski, covers a process for the production of random styrene-butadiene rubber. The rubber produced by this process is characterized as having an increased vinyl content (as much as 27 percent) as a result of the presence of a polar organic compound in the polymerization reaction mixture. The process involves the use of an organic lithium catalyst and a liquid solvent mixture consisting of a hydrocarbon and a polar organic compound. Tetrahydrofuran is the polar organic compound of choice in commercial operations. If amounts of styrene on the order of 35 percent or higher are desired in the copolymer, even higher vinyl contents are attained when using this procedure.

U.S. Pat. No. 3,094,512, to Short, deals with a process for preparing random styrene-budadiene rubber with a low vinyl content. The catalyst is an organic lithium compound. The novel feature is that the monomers are charged to the polymerization zone at a rate which is less than the normal polymerization rate of the system, and it is a requirement that the monomers be charged at such controlled rate. Polar compounds are substantially excluded from the system in order to obtain low vinyl content copolymers.

U.S. Pat. No. 3,294,768, to Wofford, also deals with the production of styrene-butadiene rubber. In this case, a mixed catalyst is used comprising an organic lithium compound and an organic salt of sodium, potassium or the like. The latter salts are completely insoluble in hydrocarbon solvents and, therefore, are added to the raction mixture as a solid. This is, at best, difficult and complicated in any large scale or continuous operation. The patentee overcomes this drawback by solubilizing salts, similar to those used by Wofford, by reaction with alkylated phenols.

U.S. Pat. No. 3,324,191, to Wofford, conducts the polymerization of styrene and butadiene in the presence of an organic lithium compound, an organic compound of sodium, potassium or the like and a polar material including water and alcohols. The use of water and alcohols, added as such, has no effect on increasing the solubility of the sodium, potassium or the like compounds. The presence of an aromatic hydrocarbon with benzylic hydrogen atoms, such as toluene, is required to achieve molecular weight regulation. Heat aging is proposed to assist in the solubilization of the catalyst, but this tends to be destructive of the catalyst.

British Pat. No. 994,726 also shows a styrene-butadiene polymerization process. It calls for incremental addition of the butadiene, but this is a process step which is extremely difficult to control since it is necessary to have detailed knowledge of reactor conditions at all times. If the reaction is controlled improperly, the products tend to have long blocks, especially at the end of the chain.

U.S. Pat. No. 3,520,858, to Bodnar et al., uses hydrogen with an organic lithium catalyst in a solution process for making styrene-butadiene rubber. The use of the hydrogen minimizes gel formation and permits a large reduction in the amount of catalyst used. The use of hydrogen also provides molecular weight regulation. It has been found that the use of the catalyst and process of the invention claimed in the present application results in a rate of reaction which is four times faster than that achieved by the use of the Bodnar et al. catalyst and process.

The process of the present invention for preparing conjugated diene copolymers is based on the use of a cocatalyst comprising an organic lithium compound and a potassium salt which is used in the form of a complex with water or an alcohol. The use of such a complex provides a completely soluble catalyst and thereby permits control of the polymerization process to produce copolymers having optimum properties. The molecular weight range of the products of this invention is normally from about 5,000 to about 1,000,000. The molecular weight of the products of this invention is readily determined by dividing the amount of monomer used by the moles of lithium catalyst used in making such products.

A major end-use of the copolymers of this invention is as tire tread rubber. For this purpose, the copolymers preferably are completely random or pseudorandom, have an 8–23 percent vinyl content, have a low Tg (glass transition temperature) and a 15–45 percent content of the vinyl-substituted aromatic hydrocarbon. Such properties are readily attained by the process of this invention. It has also been found that the pseudorandom copolymers of this invention make desirable tire tread rubbers. Vulcanizates of copolymers having long styrene blocks have poor hysteresis properties, this having the undesirable effect of causing heat build-up in tires made from such copolymers.

FIG. 1 is a graph showing the relationship between $\Delta Tg$ and mole percent of styrene for a pure random styrenebutadiene copolymer and the pseudorandom styrene-butadiene copolymer of this invention, respectively.

Conjugated dienes for use in this invention preferably contain from four to twelve carbon atoms per molecule and include 1,3-butadiene, isoprene, 1,3-pentadiene, 2,3-dimethyl-1,3-butadiene, 2 methyl-1,3-pentadiene, 2,3-dimethyl-1,3-pentadiene, 2-phenyl-1,3-butadiene, and 4,5-diethyl-1,3-octadiene. The vinyl-substituted aromatic hydrocarbons that can be used are such hydrocarbons in which the vinyl group is attached to a nuclear carbon atom. Examples of preferred vinyl-substituted aromatic hydrocarbons are styrene, 1-vinylnaphthalene and 3-methylstyrene. Examples of other compounds of this type which can be used include 3,5-diethylstyrene, 4-n-propylstyrene, 2,4,6-trimethylstyrene, 4-dodecylstyrene, 3-methyl-5-n-hexylstyrene, 4-phenylstyrene, 2-ethyl-4-benzylstyrene, 4-p-tolylstyrene, 3,5-diphenylstyrene, 2,3,4,5-tetraethylstyrene, 3-(4-n-hexylphenyl)styrene, 3-ethyl-1-vinylnaphthalene, 6-isopropyl-1-vinylnaphthalene, 3,6-di-p-tolyl-1-vinylnaphthalene, 6-cyclohexyl-1-vinylnaphthalene, 8-phenyl-1-vinylnaphthalene, 7-dodecyl-2-vinylnaphthalene, alpha-methylstyrene, and the like. It is desirable that the vinyl-substituted aromatic hydrocarbon be used in an amount of from about 5 to about 50 parts by weight based on 100 parts by weight of total monomers.

The organic lithium component of the catalyst is similar to the organic lithium compounds which have been used in the prior art. The formula is RLi, wherein R is a hydrocarbon radical selected from the group consisting of aliphatic, cycloaliphatic and aromatic radicals. The R in the formula preferably contains from 1 to 20 carbon atoms, although higher molecular weight compounds can be used. Examples of suitable organic lithium compounds include methyllithium, isopropyllithium, n-butyllithium, sec-butyllithium, tert-octyllithium, n-decyllithium, phenyllithium, naphthyllithium, 4-butylphenyllithium, p-tolyllithium, 4-phenylbutyllithium, cyclohexyllithium, 4-butylcyclohexyllithium, 4-cyclohexylbutyllithium, and the like.

The other component of the catalyst is a complex having the formula

wherein R' is an alkyl group containing a minimum of 8 carbon atoms per group and a maximum of 26 carbon atoms in one or more such groups, R'' is selected from the group consisting of hydrogen and aliphatic, cycloaliphatic and aromatic hydrocarbon radicals, Ar is an arylene radical containing one aromatic ring, and y is an integer from 1 to 3, inclusive. Such potassium-containing soluble catalysts are formed by reacting certain hydrocarbon soluble alkylphenols with potassium hydroxide or alkoxide to give a potassium phenolate in the form of a complex with the reaction by-product.

The best way to prepare such soluble complexes is by reacting, e.g., potassium t-butoxide with the phenol in, e.g., heptane, agitating, if desired, the reaction mixture under an inert atmosphere, e.g., nitrogen, for several hours at room temperature. Preferred phenols for use in making this potassium-containing catalyst component include octylphenol, nonylphenol and polyisobutylphenol. The polyisobutyl group in the latter compound contains, on the average, 26 carbon atoms.

Suitable potassium-containing reactants are potassium hydroxide and potassium t-butoxide. Other suitable potassium-containing reactants include the potassium derivatives of the following alcohols: ethanol, 3-propenol, propynol, 1-buten-3-ol, methylisopropylcarbinol, n-heptanol, triptanol, tri-t-butyl-carbinol, 1-dodecanol, cyclopentanol, cyclohexanol, alpha-terpineol, phenylcarbinol, benzylcarbinol, styrylcarbinol, phenol and symxylenol.

The amount of the organic lithium compound to be used is from about 0.1 to about 20 millimoles per 100 grams of the mixture of monomeric hydrocarbons. The amount of the potassium-containing complex to be used is expressed in terms of the Li/K molar ratio of the cocatalyst. This ratio should be from about 4/1 to about 25/1 when an aliphatic hydrocarbon solvent is used in the polymerization reaction mixture and from about 20/1 to about 90/1 when an aromatic hydrocarbon solvent is used. When a completely random copolymer is desired, the Li/K molar ratio of the cocatalyst should be adjusted to from about 4/1 to about 5/1 when an aliphatic hydrocarbon solvent is used and to from about 20/1 to about 30/1 when an aromatic hydrocarbon solvent is used. When it is desired to form a pseudorandom copolymer, containing blocks having up to 3 to 4 units of the vinyl-substituted aromatic hydrocarbon interspersed throughout the copolymer chain, the Li/K molar ratio of the cocatalyst is adjusted to from above 5/1 to about 25/1 when an aliphatic hydrocarbon solvent is used and to from above 30/1 to 90/1 when an aromatic hydrocarbon solvent is used. When a mixture of aliphatic and aromatic hydrocarbon solvents is used, a completely random copolymer is obtained by adjusting the Li/K molar ratio of the cocatalyst to a value ranging from 4 + (0.24 × volume percent of the aromatic hydrocarbon solvent) to less than 6 + (0.24 × volume percent of the aromatic hydrocarbon solvent). Similarly, when a mixture of aliphatic and aromatic hydrocarbon solvents is used and it is desired to obtain a pseudorandom copolymer, the Li/K molar ratio of the cocatalyst is adjusted to a value ranging from 6 + (0.24 × volume percent of the aromatic hydrocarbon solvent) to 25 + (0.65 × volume percent of the aromatic hydrocarbon solvent). When an aromatic hydrocarbon solvent is used alone and it is desired to form a random copolymer, a preferred Li/K molar ratio of the cocatalyst is from 25/1 to 30/1. Similarly, when a pseudorandom copolymer is to be formed, the preferred Li/K molar ratio of the cocatalyst is from 75/1 to 85/1 when the solvent is an aromatic hydrocarbon and is from 15/1 to 22/1 when the solvent is an aliphatic hydrocarbon. In all cases, a preferred range for the amount of the organic lithium compound to be used is from 0.25 to 1.5 millimoles per 100 grams of total hydrocarbon monomers.

The solvents in which the polymerization reaction is conducted are selected from the group consisting of saturated aliphatic hydrocarbons and aromatic hydrocarbons which do not contain benzylic hydrogen atoms. Aromatic hydrocarbons with benzylic hydrogen atoms produce molecular weight regulation, so that such hydrocarbons can be used if such an effect is desired. Any aliphatic hydrocarbon is suitable for this purpose as long as it is liquid at the polymerization temperature. Suitable saturated aliphatic hydrocarbon solvents include 2,5-dimethylhexane, n-decane, di-t-amyl, n-hexadecane, cyclohexane and methylcyclohexane. Suitable aromatic hydrocarbon solvents include benzene, tert-butyl benzene, naphthalene and diphenyl.

The amount of solvent used is not critical and is normally dictated by the viscosity of the reaction mixture which can conveniently be handled. The preferred amount is such that the solids content of the solution at the end of the polymerization is on the order of 5–15 weight percent.

The polymerization temperature in the process of this invention is not critical. Generally, it is preferred to carry out the polymerization reactions at a temperature between 0° and 100° C or higher.

The pseudorandom copolymers of this invention are novel products. As has been indicated, they differ from the completely random copolymers by containing blocks having 2 to 4 units of the vinyl-substituted aromatic hydrocarbon, in which the vinyl group is attached to a nuclear carbon atom, interspersed throughout the copolymer chain. They are also characterized by having a vinyl content of from about 7 to about 15 weight percent, by having a cis and trans content of from about 30 to about 50 weight percent, respectively, with the cis to trans ratio always being greater than 0.75, and by having a Tg no higher than −70° C at a styrene content of from about 10 to about 50 weight percent, based on the copolymer. Tire tread stock having a Tg of −70° C and lower has an excellent balance of tread wear and traction. An advantage of the pseudorandom copolymers is that they can be produced to contain more of the inexpensive vinyl-substituted aromatic hydrocarbon without affecting the desired properties of the copolymer. This is contrary to the situation in the case of the completely random copolymers where an increase in the amount of vinyl-substituted aromatic hydrocarbon in the copolymer does have a decided effect on the copolymer properties. Desirable amounts of the vinyl-substituted aromatic hydrocarbon in the pseudorandom copolymers range from about 10 to about 50 weight percent, based on the copolymer. The pseudorandom copolymers may be thought of as being tapered in that the first polymerized portion of each chain has less styrene than the last polymerized portion of each chain. If the vinyl-substituted aromatic hydrocarbon is present in the copolymer in larger blocks than those specified, vulcanizate properties such as hysteresis can adversely affected.

In general, the unperturbed length of the polybutadiene segments determines the Tg of the copolymer. When pure polybutadiene is interrupted by progressively more and more randomly dispersed "hard" segments (styrene), the Tg progressively increases depending on the number of hard segments. In a pure random polymer where the styrene units consist essentially of one molecule of styrene, the change in Tg with mole percent of styrene can be calculated from the following formula and as shown in FIG. 1:

$$Y = 1.721(x)$$

where $x$ = mole percent of styrene and $Y = \Delta Tg$. The straight line relationship shown in FIG. 1 can be used to determine (from the change in Tg) the number of styrene segments which are perturbing the polybutadiene sequence length.

The change in Tg experienced per mole percent of styrene in a pseudorandom polymer does not follow the straight line relationship but rather obeys the following equation and as shown in FIG. 1 where:

$$Y = 27.77 \left[1 - e^{-.0625(x)}\right]$$

For example, a $\Delta Tg$ of 20° in a random polymer is produced by 12 mole percent of styrene while 20 mole percent of styrene are required to produce this result for the pseudorandom polymer. Since the $\Delta Tg$ depends on the number of hard segments, the number must be the same in both polymers, but, since the pseudorandom polymer has more mole percent styrene,—some of them have to be in blocks. The maximum and minimum percent of styrene in blocks can be calculated as follows:

With 12 styrene segments (in the non-blocky random polymer), it means that you have 12 styrene molecules for every 88 butadiene molecules. The average length of the butadiene segment is about seven units giving a rise of 20° to the Tg.

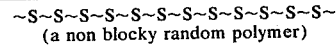
(a non blocky random polymer)

In the corresponding pseudorandom polymer, 20 styrene molecules are spaced so that the average length of the butadiene segment is still about 7 units. However, there are eight more styrene molecules per 100 total to be incorporated; therefore, the maximum blockiness would arise from the formation of units of 2 styrene molecules up to the maximum permitted.

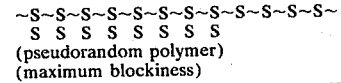
(pseudorandom polymer)
(maximum blockiness)

In this particular case, 80% of the styrene is in blocks and 20 percent is non-blocky. On the other hand, the minimum percent blockiness would arise in the unlikely situation that the styrene makes up blocks of four units until the maximum percent styrene is realized resulting in 55 percent of the styrene in block form.

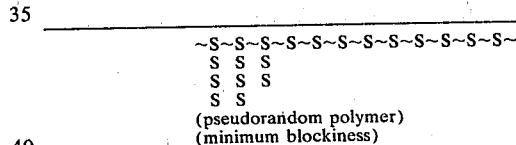
(pseudorandom polymer)
(minimum blockiness)

Therefore, for a pseudorandom polymer having a $\Delta Tg$ of 20° and 20 mole percent styrene, the maximum percent of blocky styrene is 80 percent while the minimum is 55 percent.

The following table serves to illustrate the maximum and minimum percent of blocky styrene calculated for the polymers bearing Sample identifications 21–34, inclusive, in Example VI:

| Wt. % Styrene | Mole % Styrene | Random Tg | Polymer Tg | Pseudo-Random Tg | Polymer Tg | % Block Styrene Max. | % Block Styrene Min. |
|---|---|---|---|---|---|---|---|
| 0 | 0 | −86 | 0 | −97 | 0 | | |
| 12.5 | 6.9 | −74 | 12 | −88 | 9 | 40.6 | 27.5 |
| 25 | 14.7 | −63 | 23 | −80 | 17 | 63.9 | 42.9 |
| 37.5 | 23.6 | −46 | 40 | −75 | 22 | 89.8 | 60.2 |
| 50 | 34.0 | −28 | 58 | −73 | 24 | 100.0 | 78.5 |
| 62.5 | 46.0 | − 6 | 80 | | | | |
| 75 | 61.0 | +22 | 108 | | | | |
| 87.5 | 78.5 | +50 | 136 | | | | |
| 90 | 82.4 | +53 | 139 | | | | |

In general, the outside limits on the amounts of 2–4 unit styrene blocks in the copolymers are a minimum of 21.8 percent of the total styrene in the copolymers and a maximum of 100 percent.

There are no large blocks (i.e., larger than 4 styrene units) present in the pseudorandom copolymer. This fact is substantiated by Nuclear Magnetic Resonance and ozonolysis and explained in the last two paragraphs in Example VI.

The term "pseudorandom" has been adopted as descriptive of the copolymers of this invention. The term "pseudo" means "a close resemblance to"—which my copolymer actually is and yet distinguishable from a random type copolymer.

The butadiene and the non-block styrene are distributed throughout the chain as follows: the blocks of 2–4 styrene molecules are present with the non-block single styrene molecule units. Each unit whether in block or non-block is bordered by butadiene. The average length of the unperturbed butadiene segments is determined by the total number of styrene segments. This is an average length which means that there is a distribution of butadiene segment lengths whose average length depends on the number of styrene segments.

Further aspects of this invention will be evident from the following examples.

EXAMPLE I

This example describes the preparation of the catalyst and a typical method of preparing random or pseudorandom copolymers of styrene and butadiene.

a. Soluble Catalyst

Dissolve 22.0 g (0.1 m) nonyl phenol in dry, anaerobic neptane (to make 100 ml). Add 11.2 grams of potassium t-butoxide. Shake (under $N_2$ atmosphere) for several hours during which time the KOtBu will dissolve to give a clear solution. This solution, containing

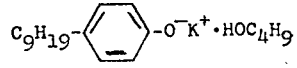

is 1.0 molar; such that 1 ml = 1.0 mm.

This solution is utilized with BuLi to produce random and pseudorandom copolymers of styrene and butadiene.

b. Typical Polymerization for Producing Random Copolymers

To a 500 ml bottle, capped with a rubber gasket, a teflon sealer and a metal cap with holes, are added 300 ml of solvent (dry, anaerobic) (e.g. benzene). Next, 30 grams of butadiene and 10 grams of pure styrene are added. To this, through the holes in the stopper, is added .02 millimole of the above prepared soluble catalyst. Then 0.25 ml of 1.6 N BuLi (in hexane) is added. The mixture is allowed to react to completion. This usually requires about 2-3 hours at room temperature or a shorter time if higher temperatures are employed. The reaction mixture is shortstopped with 5 ml of an alcohol (e.g. isopropanol) optionally containing acetic acid (sufficient to neutralize the catalyst basicity) and an antioxidant such as Santowhite (4,4'-thiobis (6-t-butyl-m-cresol)) crystals. The polymer bottle is opened and the contents are flocculated in methanol, ethanol, isopropanol, or etc. (1 liter containing 1-2 grams of antioxidant). The polymer crumb is separated by filtration and dried in a vacuum oven. The yield is 100 percent. This polymer prepared under typical conditions referred to above yields a random SBR polymer containing from 20–22% vinyl (normalized; i.e., converted so that the vinyl, cis and trans contents total 100 percent). The Li/K ratio used was 20/1. If an 80/1 ratio had been used, the product would have been a pseudorandom, low-Tg copolymer. If a 20/1 ratio with heptane or another aliphatic solvent had been used, the product would have been pseudorandom and more potassium salt complex (to give 4/1 Li/K) would have been required to give a random copolymer.

EXAMPLE II

This example demonstrates the use of the soluble catalyst (prepared according to the method detailed in example I) as a randomizing agent for styrene and butadiene and the effect of the Li/K ratio in an aromatic media.

In this series of experiments, all polymerizations were performed as follows:

Into a dry, anaerobic bottle was introduced:

a. 300 ml pure benzene
b. A variable amount of the soluble salt prepared by reacting polyisobutyl phenol* with KOH (as a 0.2 N solution in benzene)

*Rohm and Haas "polyisobutylphenol 450"

c. Ten grams of styrene—bottle is then capped, there being holes in the stopper through which are introduced the following:
d. Thirty grams of butadiene
e. 0.5 ml of 1.6 N BuLi (in hexane)

Once the BuLi was added, polymerization began immediately. The speed of the polymerization was dependent on the amount of potassium salt added. After initial shaking, no agitation was used. The polymerizations were started at room temperature, and the exothermic heat caused the reaction temperature to rise to about 45° C. In order to determine the extent of randomization, samples were taken of each bottle at various conversions and the % styrene in the formed copolymer was determined by refractive index. The results for these samples, where the Li/K ratio was varied by changing the amount of potassium salt added, are shown below.

| Sample Identification | 1 | 2 | 3 | 4 | 5 | 6 | 7 |
|---|---|---|---|---|---|---|---|
| mm KOArR'.HOR"100 | 0.4 | 0.16 | 0.08 | .04 | .03 | .02 | .01 |
| mm BuLi | 0.8 | 0.8 | 0.8 | 0.8 | 0.8 | 0.8 | 0.8 |
| Li/K | 2/1 | 5/1 | 10/1 | 20/1 | 27/1 | 40/0 | 80/1 |
| % Conversion | 68 | 68 | 24.6 | 15.7 | 14 | 16 | 10 |
| % Styrene | 40.5 | 36.8 | 41 | 28 | 24 | 19.5 | 8 |
| % Conversion | 72 | 100 | 59.5 | 43 | 26 | 38 | 22 |
| % Styrene | 39.1 | 26 | 34.6 | 28 | 25 | 21 | 9 |
| % Conversion | 75 | — | 97 | 85 | 89 | 77 | 37 |
| % Styrene | 39.1 | — | 28.4 | 25.5 | 25 | 21 | 11 |
| % Conversion | 100 | — | 100 | 100 | 100 | 100 | 100 |

| Sample Identification | 1 | 2 | 3 | 4 | 5 | 6 | 7 |
|---|---|---|---|---|---|---|---|
| % Styrene | 25 | — | 25 | 25 | 25 | 25 | 25 |

From these data, it can be seen that maximum randomization (equal styrene at all stages of polymerization) occurs with the soluble salt at a Li/K ratio of 27/1 (a very small amount of potassium salt).

|  | 1 | 2 | 3 | 4 | 5 | 6 | 7 |
|---|---|---|---|---|---|---|---|
| % Styrene | —* | 26 | 26 | 27 | 27 | 26 | 25 |
| % cis (**) | — | 28 | 30 | 36 | 35 | 37 | 39 |
| % trans (**) | — | 39 | 41 | 45 | 47 | 46 | 49 |
| % vinyl (**) | — | 34 | 28 | 23 | 21 | 18 | 13 |
| Tg (***) | — | −70 | −60 | −63 | −64 | −67 | −80 |
| NMR | — | R | R | R | R | R | SB |

*denotes that no data were obtained.
**determined by infrared spectroscopy.
***determined by differential thermal analysis.
R = random styrene.
SB = short blocks (3–4 units) of styrene.

It can be seen that vinyl content decreases as the amount of potassium used decreases.

EXAMPLE III

The purpose of this example is to establish that the soluble potassium salts are more potent randomizing agents in an aromatic medium (see Example II) when compared with the insoluble KOtBu salt disclosed in the prior art (U.S. Pat. No. 3,294,768). This example was carried out in all respects the same as Example II except for the potassium salt substitution and the insolubility of such salt.

| Sample Identification | 8 | 9 | 10 | 11 |
|---|---|---|---|---|
| KOtBu, mmoles | 0.4 | 0.2 | 0.13 | 0.08 |
| BuLi, mmoles | 0.8 | 0.8 | 0.8 | 0.8 |
| Li/K ratio | 2/1 | 4/1 | 6/1 | 10/1 |
| % Conversion | 32 | 17.5 | 16 | 17 |
| % Styrene | 43 | 31 | 19 | 13 |
| % Conversion | 61 | 50 | 31 | 33 |
| % Styrene | 36 | 29 | 20 | 14 |
| % Conversion | 100 | 61 | 50 | 63 |
| % Styrene | 24 | 29 | 22 | 17 |
| % Conversion | — | 100 | 100 | 100 |
| % Styrene | — | 24 | 24 | 24 |

The data clearly indicate that maximum randomization occurs at about a 4/1 – 6/1 Li/K ratio and that the soluble potassium salts shown in Example II are more potent randomizing agents in benzene than is the insoluble KOtBu catalyst.

EXAMPLE IV

In contrast to the series of experiments shown in Example II, this example shows the randomization of styrene-butadiene polymerizations using the soluble salt in an alkane media. The polymerizations in this series of experiments were run under exactly the same conditions as disclosed in Example II, except that heptane was used as the solvent.

| Sample Identification | 12 | 13 | 14 | 15 |
|---|---|---|---|---|
| Li/K ratio | 2/1 | 4/1 | 8/1 | 16/1 |
| % Conversion | 25 | 11.7 | 6.4 | 6.8 |
| % Styrene | 50 | 23 | 9 | 3.2 |
| % Conversion | 35 | 27 | 20 | 18 |
| % Styrene | 47 | 27 | 15.3 | 6.8 |
| % Conversion | 96 | 100 | 100 | 100 |
| % Styrene | 25 | 25 | 25 | 25 |

The data clearly show that, in alkane solvents and using the soluble salt, the maximum randomization occurs at a Li/K ratio of about 4/1.

EXAMPLE V

This example shows the effect of solvent mixtures (alkane/aromatic) on the randomizing ability of the soluble potassium salt and on the resultant polymer characteristics. In this series of experiments, polymerizations were run under exactly the same conditions as disclosed in Example II using a Li/K ratio of 20/1 in each experiment, except for the variation in the solvent.

| Sample Identification | 16 | 17 | 18 | 19 | 20 |
|---|---|---|---|---|---|
| Solvent |  |  |  |  |  |
| Heptane (ml added) | 300 | 295 | 250 | 150 | 0 |
| Benzene (ml added) | 0 | 5 | 50 | 150 | 300 |
| % Conversion | 17.4 | 15.9 | 13 | 10.6 | 16.5 |
| % Styrene | 7.9 | 8.3 | 9.2 | 10.8 | 27 |
| % Conversion | 22.4 | 23.1 | 29.4 | 31.2 | 47.5 |
| % Styrene | 9.2 | 10 | 11.8 | 14.3 | 27 |
| % Conversion | 100 | 100 | 32.8 | 64.3 | 67.5 |
| % Styrene | 25 | 25 | 13.2 | 15.3 | 25.4 |
| % Conversion |  |  | —* | 72 | 83 |
| % Styrene |  |  | — | 16.3 | 25 |
| % Conversion |  |  |  | —* | 100 |
| % Styrene |  |  |  | — | 25 |

-continued

| Sample Identification | 16 | 17 | 18 | 19 | 20 |
|---|---|---|---|---|---|
| Polymer Characteristics | | | | | |
| % Styrene | 24 | 23 | 26 | 27 | 27 |
| % cis | 41 | 39 | 39 | 40 | 26 |
| % trans | 52 | 49 | 50 | 51 | 33 |
| % vinyl | 11 | 12 | 12 | 14 | 21 |
| Tg | −85 | −87 | −84 | −78 | −63 |

*denotes that no data were obtained.

This example shows that both the extent of randomness and the physical characteristics of the respective polymers obtained using the soluble potassium randomizing agent depend on the nature of the solvent and those characteristics can be varied either by proper choice of solvent or solvent mixtures.

EXAMPLE VI

In this example, random and pseudorandom polymers are made by polymerizing varying amounts of styrene with butadiene to give pseudorandom (in heptane solvent) and random (in benzene solvent) copolymers using the soluble potassium salt and a Li/K ratio of 20/1. All polymerizations were run exactly as shown in Example II, except for the use of heptane solvent as indicated. The following data show both types of polymers at different styrene levels with the resultant Tg's and block styrene content.

SOLVENT EFFECT WITH BuLi/KOArR'.HOR" CATALYST

SOLVENT - BENZENE (Li/K = 20/1)

| Sample Identification | % Styrene | % Vinyl (Normalized) | Tg | BLOCK STYRENE NMR | O₃ |
|---|---|---|---|---|---|
| 21 | 0 | | −86 | 0 | 0 |
| 22 | 12.5 | | −74 | 0 | 0 |
| 23 | 25 | | −63 | 0 | 0 |
| 24 | 37.5 | | −46 | 0 | 0 |
| 25 | 50 | 20–22 | −28 | 0 | 0 |
| 26 | 62.5 | | − 6 | 0 | 0 |
| 27 | 75 | | +22 | 0 | 0 |
| 28 | 87.5 | | −87, +50* | interm. | 46% |
| 29 | 90 | | −75, +53* | interm.-long | 41% |

*The two Tg readings are an indication of blockiness.

SOLVENT - HEPTANE (Li/K = 20/1)

| 30 | 0 | | −97 | 0 | 0 |
|---|---|---|---|---|---|
| 31 | 12.5 | | −88 | 0 | 0 |
| 32 | 25 | 8–10 | −80 | short | 0 |
| 33 | 37.5 | | −75 | short | 0 |
| 34 | 50 | | −73 | short | 0 |

This series of experiments demonstrates that a low Tg is maintained by pseudorandom polymers in spite of the fact that no long styrene sequences are detectable either by NMR (short = 3–4 units) or by ozonolysis procedures. Therefore, using the technique involved in the production of pseudorandom polymers, low Tg polymers containing a high % of styrene can be prepared. Such polymers, because of the short block length of the styrene, have good vulcanizate properties [particularly low heat build-up (hysteresis)], low Tg and good abrasion resistance. Vulcanizates having these physical properties can be advantageously used in the manufacture of such items as automobile tires.

In determining the amount of block styrene by ozonolysis, the sample is first ozonized in hydrocarbon solvent (benzene) and then flocculated in alcohol. Block styrene having 5 or more styrene units per block precipitates out in the alcohol and can be isolated. In 50/50 blends of butadiene and styrene homopolymers, 95 percent of the polystyrene can be recovered and accounted for by this technique.

EXAMPLE VII

This example illustrates that pseudorandom polymer (characterized by low vinyl and low Tg) can be prepared in either alkane or aromatic solvents and by controlling the Li/K ratio. Polymerization procedures were the same as disclosed in Example II.

| Sample Identification | 35 | 36 |
|---|---|---|
| Solvent | Benzene | Heptane |
| Li/K ratio | 80/1 | 20/1 |
| Polymer Characteristics | | |
| % styrene | 25 | 23 |
| % cis | 39 | 39 |
| % trans | 49 | 48 |
| % vinyl | 13 | 14 |
| Tg | −80 | −80 |
| NMR | short blocks | short blocks |

EXAMPLE VIII

This example serves to illustrate a pilot plant scale-up of the production of a pseudorandom polymer.

The polymerization was performed in a 50 gallon stirred steel autoclave. The reactor charge was as follows:

| Hexane | 100 Kg. |
|---|---|
| Butadiene | 15.4 Kg. |

-continued

| | |
|---|---|
| Styrene | 4.6 Kg. |
| BuLi | 112 millimoles |
| KOArR'.HOR''* | 2 grams |
| Li/K | 15/1 |
| Reaction Temp. | 110–120° F |

*Soluble complex of the potassium salt of nonyl phenol.

The polymerization was allowed to run overnight, 94 percent conversion being attained after 6 hours. The overall styrene content of the polymer was 24 percent. For the first 25 percent conversion, the polymer contained 16% styrene; 18% for the second 25 percent, 26 percent for the next 25 percent and 36% for the last quarter. The properties of this product are:

| | |
|---|---|
| % cis | 31 |
| % trans | 39 |
| % vinyl | 8 |
| Tg | −81 (DTA) |
| | −85 (T.P.)[1] |
| M.W. Distribution[2] | narrow |
| Mn[3] | 163,000 |
| Ml₄[4] | 110 |
| NMR | short styrene blocks |

[1]torsion pendulum.
[2]determined by gel permeation chromatography.
[3]number average molecular weight; determined by osmometer.
[4]Mooney viscosity at 212° F.

What is claimed is:

1. A process for preparing conjugated diene copolymers which comprises contacting a monomeric mixture of a conjugated diene hydrocarbon and from about 5 to about 50 parts by weight, based on 100 parts by weight of total monomers, of a vinyl-substituted aromatic hydrocarbon in which the vinyl group is attached to a nuclear carbon atom with a catalyst consisting essentially of (a) a complex having the formula

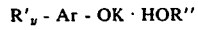

$$R'_y - Ar - OK \cdot HOR''$$

wherein R' is an alkyl group containing a minimum of 8 carbon atoms per group and a maximum of 26 carbon atoms in one or more such groups, R'' is selected from the group consisting of hydrogen and aliphatic, cycloaliphatic and aromatic hydrocarbon radicals, Ar is an arylene radical containing one aromatic ring, and y is an integer from 1 to 3, inclusive, and from about 0.1 to about 20 millimoles, per 100 grams of said monomeric mixture, of (b) an organolithium compound having the formula R Li wherein R is a hydrocarbon radical selected from the group consisting of aliphatic, cycloaliphatic and aromatic radicals, said contacting occurring in the presence of a solvent which is liquid at the polymerization temperature and is selected from the group consisting of saturated aliphatic hydrocarbons and aromatic hydrocarbons which do not contain benzylic hydrogen atoms, the Li/K molar ratio of the cocatalyst being from about 4/1 to about 25/1 when an aliphatic hydrocarbon solvent is used and from about 20/1 to 90/1 when an aromatic hydrocarbon solvent is used.

2. The process of claim 1 in which a random copolymer is prepared by adjusting the Li/K molar ratio of the cocatalyst to from about 4/1 to about 5/1 when an aliphatic hydrocarbon solvent is used and to from about 20/1 to about 30/1 when an aromatic hydrocarbon solvent is used.

3. The process of claim 1 in which a random copolymer is prepared by adjusting the Li/K molar ratio of the cocatalyst to a value of 4 to less than 6 + (0.24 × volume percent of the aromatic hydrocarbon solvent) when a mixture of aliphatic and aromatic hydrocarbon solvents is used.

4. The process of claim 1 in which a pseudorandom copolymer, containing blocks having up to 3 to 4 units of said vinyl-substituted aromatic hydrocarbon interspersed throughout the copolymer chain, is prepared by adjusting the Li/K molar ratio of the cocatalyst to from above 5/1 to about 25/1 when an aliphatic hydrocarbon solvent is used and to from above 30/1 to 90/1 when an aromatic hydrocarbon solvent is used.

5. The process of claim 1 in which a pseudorandom copolymer, containing blocks having up to 3 to 4 units of said vinyl-substituted aromatic hydrocarbon interspersed throughout the copolymer chain, is prepared by adjusting the Li/K molar ratio of the cocatalyst to a value of from 6 + (0.24 × volume percent of the aromatic hydrocarbon solvent) to 25 + (0.65 × volume percent of the aromatic hydrocarbon solvent) when a mixture of aliphatic and aromatic hydrocarbon solvents is used.

6. The process of claim 1 in which a random copolymer is prepared using butadiene as the diene hydrocarbon and 5 to 50 parts by weight, based on 100 parts by weight of total monomers, of styrene, (a) a complex formed by interacting equimolar amounts of polyisobutylphenol and potassium hydroxide and 0.25 to 1.5 millimoles, per 100 grams of total monomers, of (b) butyl lithium, the solvent being benzene and the Li/K molar ratio being from 25/1 to 30/1.

7. The process of claim 6 in which the potassium containing catalyst is a complex formed by interacting equimolar amounts of nonyl phenol and potassium t-butoxide.

8. The process of claim 7 in which the solvent is heptane and the Li/K molar ratio is from 4/1 to 5/1.

9. The process of claim 1 in which a pseudorandom copolymer is prepared using butadiene as the diene hydrocarbon and 5 to 50 parts by weight, based on 100 parts by weight of total monomers, of styrene, (a) a complex formed by interacting equimolar amounts of polyisobutylphenol and potassium hydroxide and 0.25 to 1.5 millimoles per 100 grams of total monomers, of (b) butyl lithium, the solvent being benzene and the Li/K molar ratio being from 75/1 to 85/1.

10. The process of claim 9 in which the solvent is heptane and the Li/K molar ratio is from 15/1 to 22/1.

11. The process of claim 10 in which the solvent is hexane.

* * * * *